United States Patent [19]

Johnson et al.

[11] Patent Number: 5,228,742

[45] Date of Patent: Jul. 20, 1993

[54] APPARATUS FOR CONNECTING COMPOSITE VEHICLE BODY PANELS TO COMPOSITE VEHICLE UNDERBODIES

[75] Inventors: Roger E. Johnson, Shelby Township; Thomas C. Jensen, Clarkston; Edward C. Van Rossen, Roseville, all of Mich.

[73] Assignee: General Motors Corporation, Detroit, Mich.

[21] Appl. No.: 952,014

[22] Filed: Sep. 28, 1992

[51] Int. Cl.[5] .............................................. B62D 29/04
[52] U.S. Cl. ................................... 296/191; 296/183; 296/185; 296/901
[58] Field of Search ................ 296/183, 185, 191, 901

[56] References Cited

U.S. PATENT DOCUMENTS

| | | | |
|---|---|---|---|
| 3,875,661 | 4/1975 | Lidstrom et al. | 296/191 |
| 4,529,244 | 7/1985 | Zaydel | 296/191 |
| 4,573,733 | 3/1986 | Zaydel | 296/191 |
| 4,973,102 | 11/1990 | Bien | 296/187 |
| 5,098,765 | 3/1992 | Bien | 296/191 X |

Primary Examiner—Robert R. Song
Attorney, Agent, or Firm—William A. Schuetz

[57] ABSTRACT

A connecting apparatus for connecting a composite outer body panel of a vehicle to a composite underbody of a vehicle whereby the composite outer body panel is allowed to move relative to the composite underbody due to thermal expansion and contraction caused by the aforementioned members having different coefficients of linear thermal expansion. The connecting apparatus is subtle in appearance, hidden from outside the vehicle and simple to assemble and disassemble.

9 Claims, 3 Drawing Sheets

APPARATUS FOR CONNECTING COMPOSITE VEHICLE BODY PANELS TO COMPOSITE VEHICLE UNDERBODIES

The present invention relates, in general, to mounting composite vehicle body panels to composite vehicle underbodies, and more particularly, a connecting apparatus which allows for the relative movement between a composite outer body panel of a pickup truck and a composite pickup truck cargo box caused by the aforementioned members having different coefficients of linear thermal expansion.

BACKGROUND OF THE INVENTION

The advancement and development of plastic materials has led to the design and implementation of composite outer body panels for vehicles as well as composite cargo boxes for pickup trucks. Each of these composites requires different performance characteristics for their particular application. For an outer body panel of a vehicle, a reinforced reaction injection moldable (RRIM) material is injection molded to provide an outer body panel with certain desired properties, such as a class "A" surface with a medium flex modulus and good impact performance. For a pickup truck cargo box, a structural reaction injection moldable (SRIM) material is utilized to provide the rigidity and strength that is needed for a pickup truck cargo box as well as providing a material that has good flexibility and impact performance. To provide the required strength in the pickup truck cargo box, the SRIM material has a high glass strand content whereas the RRIM material has a low glass strand content. The high glass content of the SRIM material creates a low coefficient of linear thermal expansion while the lower glass content of the RRIM material creates a high coefficient of linear thermal expansion. The higher coefficient of linear thermal expansion of the RRIM material means that the outer body panel will thermally expand and contract more than the lower coefficient of linear thermal expansion of the pickup truck cargo box thereby causing relative movement between the aforementioned members when secured to each another. If the outer body panel is rigidly secured to the underbody and not allowed to expand and contract upon linear thermal expansion and contraction, internal stress will build in the weaker RRIM material of the outer body panel causing the outer body panel to be distorted and damaged. Linear thermal expansion is a function of the length of the material where over a six foot (1.82 meters) outer body panel, a size difference of 0.32 inches (8.0 millimeters) will occur at 150 degrees Fahrenheit (65.5 degrees Celsius) between the RRIM outer body panel and the SRIM underbody. Therefore, thermal expansion and contraction will be much greater over the longer length of the outer body panel than the shorter height of the outer body panel.

SUMMARY OF THE INVENTION

The present invention solves the above problem by providing a connecting apparatus which secures a composite outer body panel of a vehicle to a composite underbody of a vehicle while allowing for relative movement of the aforementioned members caused by the aforementioned members having different coefficients of linear thermal expansion. Tabs and slots are utilized on the top surfaces wherein the outer body panel has integral tabs extending into slots provided in the underbody. The center slot in the underbody has a close tolerance fit with the center tab so as to prevent relative lateral movement of the center and evenly split the effect of the thermal expansion and contraction between the front end and the rear end of the outer body panel. The center tab and center slot also maintain a centered alignment between the outer body panel and the underbody during thermal expansion and contraction The remaining slots in the top side of the underbody have an open tolerance fit with the tabs of the outer body panel so as to allow the tabs to move within the slots upon relative movement of the outer body panel to the underbody caused by thermal expansion and contraction. The opposite ends of the outer body panel and the underbody utilize flexible tabs which either are attached by retainers or interconnected with notches having mating tabs. The flexibility of the tabs allows for the relative movement of the outer body panel to the underbody caused by thermal expansion and contraction. The bottom sides of the outer body panel and underbody utilize a retainer and hole and slot design, wherein slots are provided in the outer body panel, and holes are provided in the underbody. One hole is provided in the center of the outer body panel which is aligned with a hole in the underbody so as to prohibit relative lateral movement of the center and evenly split the effect of the thermal expansion and contraction as previously described. Again, the centered hole to hole connection maintains a centered alignment between the outer body panel and the underbody during thermal expansion and contraction. Moderately gripping retainers are inserted through the commonly aligned holes and slots so as to allow for the movement of the outer body panel across the retainers and within the slots upon the relative movement of the outer body panel to the underbody caused by thermal expansion and contraction. The present invention is subtle in appearance, hidden from the outside of the vehicle and easily accessible for assembly and disassembly.

To this end, an object of the present invention is to provide a new and improved connecting apparatus for securing a composite outer body panel of a vehicle to a composite underbody of a vehicle while allowing for relative movement of the composite outer body panel to the composite underbody caused by the aforementioned members having different coefficients of linear thermal expansion. Another object is to provide a new and improved connecting apparatus for securing a composite outer body panel of a vehicle to a composite underbody of a vehicle and allowing for relative movement between the composite outer body panel and the composite underbody caused by thermal expansion and contraction while having the connecting apparatus subtle in appearance, hidden from outside the vehicle and easy to assemble and disassemble.

DESCRIPTION OF THE PREFERRED EMBODIMENT

Figure 1:
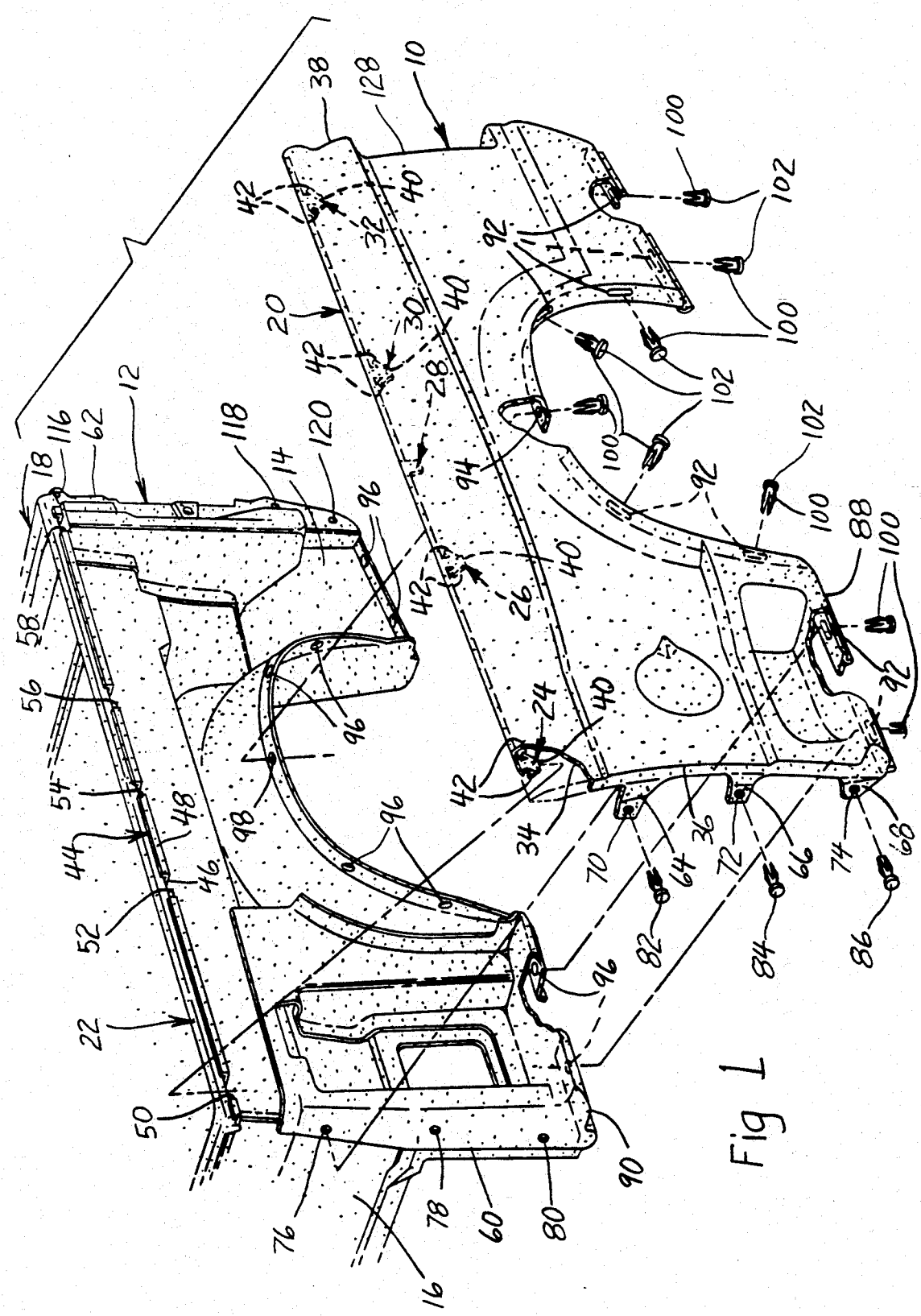
FIG. 1 is an exploded view with some parts cut-away showing the present invention utilized in connecting a composite outer body panel of a pickup truck to a composite pickup truck cargo box.

Referring to the drawings, the present invention will now be described in detail with reference to the preferred embodiment.

FIG. 1 is an exploded view showing a composite outer body panel (10) of a pickup truck (not shown) connected to a composite pickup truck cargo box (12) through the use of the present invention. The present invention is not limited to a composite pickup truck outer body panel (10) and a composite pickup truck cargo box (12) application, but rather may be utilized on any vehicle which utilizes a composite outer body panel and a composite underbody wherein relative movement occurs between the two composite members due to their composite materials having different coefficients of linear thermal expansion.

The cargo box (12) is comprised of two sides (14) (only one shown), a front side (16) and an inner end gate (18) and is molded from a conventional structural reaction injected moldable material (SRIM). The SRIM material provides the cargo box (12) with durability and rigidity while also being flexible enough to absorb forces created by various cargo carried in the cargo box (12) without damaging the cargo box (12). The outer body panel (10) is molded from a reinforced reaction injected moldable (RRIM) material which provides an excellent exterior finish as well as good impact performance. Due to the glass content provided in the SRIM material of the pickup truck cargo box (12), the SRIM material has a lower coefficient of linear thermal expansion than the RRIM material of the outer body panel (10), and therefore, the RRIM material or outer body panel will expand and contract relative to the SRIM material of the cargo box (12).

As seen in FIG. 1, the outer body panel (10) has a top side (20), and the pickup truck cargo box (12) has a top side (22) adjacent thereto. The top side (20) of the outer body panel (10) has five planar tabs (24), (26), (28), (30), (32) that are integral with and extend downward adjacent to the backside (34) of the outer body panel (10). One of the tabs (28) is centered between a front end (36) and a rear end (38) of the outer body panel (10) and is simply rectangular in shape. The other four tabs (24), (26), (30), (32) are equally spaced along the top side (20) of the outer body panel (10) and have a rectangular center portion, and each tab (24), (26), (28), (30), (32) has a free end (40) extending downward from the top side (20) of the outer body panel (10). A pair of tangs (42) are integral with and extend upward and outward from the opposite sides adjacent the free end (40) of each of the four tabs (24), (26), (30), (32). The tangs (42) are flexible so as to bend or deflect inward toward the adjacent sides of the tab (24), (26), (30), (32) upon an inward force being applied while returning to their original position upon the inward force being removed. The top side (22) of the pickup truck cargo box (12) has an L-shaped lip (44) extending outward toward the outer body panel (10) with the long leg (46) of the L-shaped lip (44) being integral with and extending outward from the top side (22) of the cargo box (12) toward the outer body panel (10), while the small leg (48) of the L-shaped lip (44) is integral with and extends upward from the long leg (46) of the L-shaped lip (44). The L-shaped lip (44) has material removed to form five slots (50), (52), (54), (56), (58) which are in common alignment with the five tabs (24), (26), (28), (30), (32) provided on the top side (20) of the outer body panel (10) and are designed to receive the five tabs (24), (26), (28), (30), (32) of the outer body panel (10). One of the five slots (54) provided in the L-shaped lip (44) is centered between a front end (60) and a rear end (62) of the cargo box (12). This center slot (54) is designed to have a tight tolerance fit with the center tab (28) of the outer body panel (10) so as to prohibit any lateral movement of the center of the outer body panel (10) thus splitting the size effect of the thermal expansion and contraction between the front end (36) and the rear end (38) of the outer body panel (10). The center tab (28) and center slot (54) maintain a centered alignment between the cargo box (12) and the outer body panel (10) during thermal expansion and contraction. The other four slots (50), (52), (56), (58) of the L-shaped lip (44) are designed to receive the other four tabs (24), (26), (30), (32) of the outer body panel (10). The tangs (42) of the four tabs (24), (26), (30), (32) bend inward toward the adjacent sides of the tabs (24), (26), (30), (32) of the outer body panel (10) as they are being inserted vertically downward into the slots (50), (52), (56), (58) of the cargo box (12). Once the tangs (42) pass through the L-shaped lip (44) of the cargo box (12), the tangs (42) return to their normal free state position and extend beyond the slots (50), (52), (56), (58) and under the L-shaped lip (44). This prevents the top side (20) of the outer body panel (10) from vertically disengaging from the cargo box (12). The tolerance fit between the central rectangular portions of the four tabs (24), (26), (30), (32) and their mating slots (50), (52), (56), (58) is such that the tabs (24), (26), (30), (32) are free to move laterally within the slots (50), (52), (56), (58). By allowing relative movement of the tabs (24), (26), (30), (32) within the slots (50), (52), (56), (58), the top side (20) of the outer body panel (10) is allowed to move relative to the cargo box (12) upon thermal expansion and contraction. The tabs (24), (26), (28), (30), (32) and L-shaped lip (44) are hidden from outside the vehicle and provide for easy assembly and disassembly.

The front end (36) of the outer body panel (10) is the end of the outer body panel (10) closest to the cab (not shown) of the pickup truck. As seen in FIG. 1, the front end (36) of the outer body panel (10) provides three flexible tabs (64), (66), (68) that are integral with and extend outward from the outer body panel (10) toward the cargo box 12. Each tab (64), (66), (68) has a hole (70), (72), (74) extending horizontally through the tab (64), (66), (68), respectively. The front end (60) of the cargo box (12) is also the end of the cargo box (12) closest to the cab, and it is adjacent to the front end (36) of the outer body panel (10). The front end (60) of the cargo box (12) has three horizontal holes (76), (78), (80) that are in common alignment with the holes (70), (72), (74) provided in the three tabs (64), (66), (68) of the front end (36) of the outer body panel (10). Three conventional push-in expanding plastic retainers (82), (84), (86) are inserted through the commonly aligned holes (70), (72), (74), (76), (78), (80) to secure the front end (36) of the outer body panel (10) to the front end (60) of the cargo box (12). The flexibility of the three tabs (64), (66), (68) of the outer body panel (10) allows for the relative movement of the front end (36) of the outer body panel (10) relative to the cargo box (12) caused by thermal expansion and contraction. The three retainers (82), (84), (86) are concealed by the cab of the pickup truck and allows the retainers (82), (84), (86) to be hidden from the outside of the vehicle while also being simple to assemble and disassemble.

As seen in FIG. 1, the outer body panel (10) has a bottom side (88) that is adjacent to a bottom side (90) of the cargo box (12). The bottom side (88) of the outer body panel (10) is provided with eight equally spaced slots (92) extending there through. The bottom side (88) of the outer body panel (10) also provides a hole (94) centered halfway between the front end (36) and the rear end (38) of the outer body panel (10). The bottom side (90) of the cargo box (12) provides eight holes (96) in common alignment with the eight slots (92) of the bottom side (88) of the composite outer body panel. One hole (98) is also provided in the bottom side (90) of the cargo box (12) in common alignment with the centered hole (94) provided in the bottom side (88) of the outer body panel (10). Nine conventional push-in expanding plastic retainers (100) are inserted through the commonly aligned holes (94), (96), (98) and slots (92) of the bottom sides (88), (90) of the outer body panel (10) and cargo box (12). The centered hole (94) in the bottom side (88) of the outer body panel (10) prohibits relative movement of the center thus splitting the size effect of the thermal expansion and contraction as previously described. Again, the centered holes (94), (98) maintain a centered alignment of the cargo box (12) relative to the outer body panel (10) during thermal expansion and contraction. The retainers (100) provide a light clamping force thus allowing the outer body panel (10) to move across the retainers (100) within the slots (92) upon the bottom side (88) of the outer body panel (10) moving relative to the cargo box (12), while still securing the outer body panel (10) to the cargo box (12). Only the heads (102) of the retainers (100) can be seen from the outside of the vehicle, but the (102) can only be viewed from the underside of the vehicle as in today's vehicles.

Figure 2:
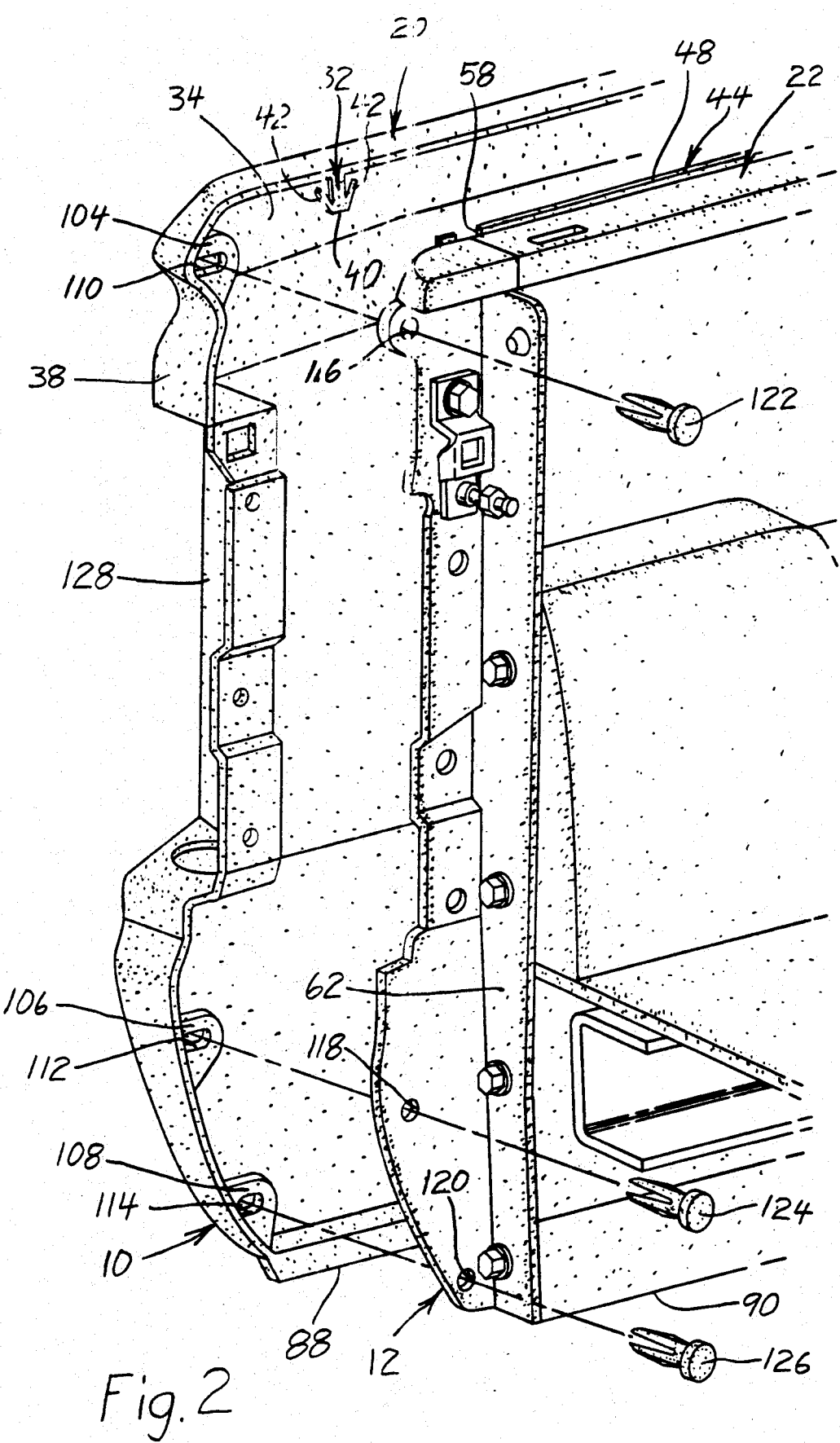
FIG. 2 is an enlarged exploded view showing the tail light portion of the composite outer body panel of a pickup truck and the composite pickup truck cargo box as shown in FIG. 1.

As seen in FIG. 2, the rear end (38) of the outer body panel (10) is connected to the rear end (62) of the cargo box (12) utilizing the same connecting apparatus as the bottom sides (88), (90) of the aforementioned members (10), (12). The rear end (38) of the outer body panel (10) provides three planar tabs (104), (106), (108) that are integral with and extend inward from the rear end (38) of the outer body panel (10) so as to be hidden from the outside of the vehicle. The three tabs (104), (106), (108) have slots (110), (112), (114) that are in common alignment with three holes (116), (118), (120) provided in the rear end (62) of the cargo box (12). Three push-in expanding plastic retainers (122), (124), (126) are inserted through the commonly aligned slots (110), (112), (114) and holes (116), (118), (120) of the rear ends (38), (60). As described previously for the bottom sides (88), (90), the slots (110), (112), (114) allow the outer body panel (10) to move across the retainers (122), (124), (126) within the slots (110), (112), (114), thus allowing for the relative movement of the outer body panel (10) relative to the cargo box (12) upon thermal expansion and contraction. It should also be noted that the outer body panel (10) has a recess (128) molded into the outer body panel (10) to provide for the rear tail light (not shown) which allows the rear tail light to move with the outer body panel (10) upon thermal expansion and contraction. This insures a constant alignment relationship between the rear tail light and the outer body panel (10).

Again, the plastic retainers (122), (124), (126) are hidden from outside the vehicle and are simple to assemble and disassemble.

Figure 3:
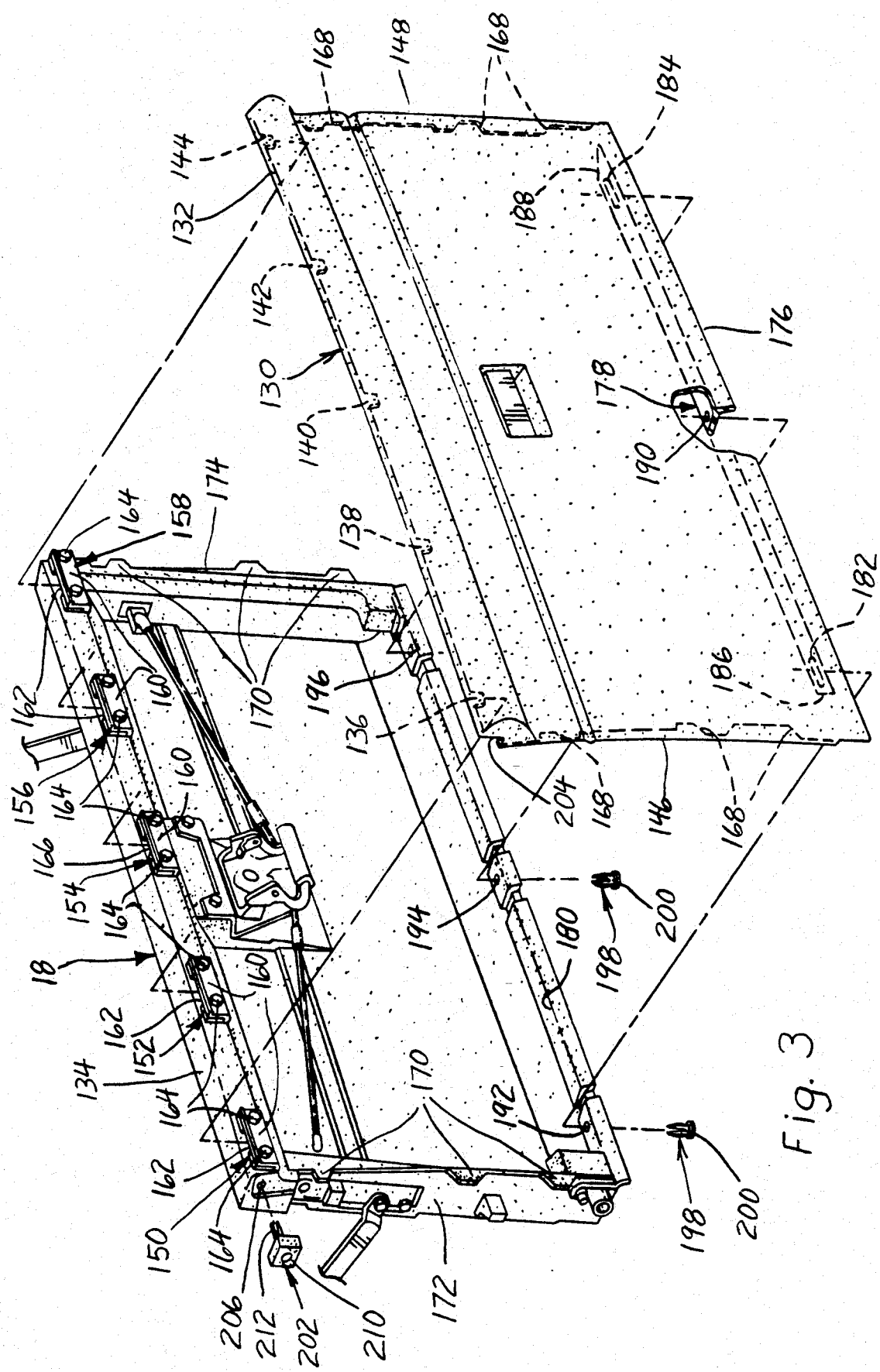
FIG. 3 is an exploded view showing the present invention utilized in connecting a composite outer end gate of a pickup truck to a composite inner end gate of pickup truck cargo box.

A second embodiment of the present invention is shown in FIG. 3. A composite outer end gate (130) of a pickup truck (not shown) is connected to a composite inner end gate (18) of a pickup truck. The outer end gate (130) has a top side (132) which lies adjacent to a top side (134) of the inner end gate (18). The top side (132) of the outer end gate (130) has five substantially rectangular tabs (136), (138), (140), (142), (144) extending downward from and integral with the top side (132) of the outer end gate (130). The five tabs (136), (138), (140), (142), (144) are equally spaced with one tab (140) being centered on the top side (132) of the outer end gate (130) between opposite ends (146), (148) of the outer end gate (130). The top side (134) of the inner end gate (18) has five brackets (150), (152), (154), (156), (158) that receive the five tabs (136), (138), (140), (142), (144) of the outer end gate (130). The brackets (150), (152), (154), (156), (158) are U-shaped with the closed portion (160) of the U-shape extending outward toward the outer end gate (130), and the open portion of the U-shape of brackets (150), (152), (156), (158) forming a slot (162), and the U-shaped of bracket (154) forming slot (166) when mounted to the inner end gate (18). The top side (134) of the inner end gate (18) has five pairs of holes (not shown), and each bracket (150), (152), (154), (156), (158) has a pair of holes (not shown) extending through the bracket (150), (152), (154), (156), (158). Self-tapping fasteners (164) are threaded through the holes in the brackets (150), (152), (154), (156), (158) and into the holes provided in the inner end gate (18), thereby mounting the brackets (150), (152), (154), (156), (158) to the top side (134) of the inner end gate (18). The tabs (136), (138), (142), (144) on the top side (132) of the outer end gate (130) are in common alignment with and received by the slots (162) formed in the brackets (150), (152), (156), (158). The center bracket (154) has a slot (166) with a close tolerance fit to its corresponding center tab (140) on the outer end gate (130). This prohibits the center of the outer end gate (130) from relative lateral movement thus splitting the size effect between the front end (146) and the rear end (148) of the outer end gate (130) (as seen in FIG. 3) caused by thermal expansion and contraction. The close tolerance fit between the centered slot (166) and the centered tab (140) also maintain a centered alignment between the inner end gate (18) and the outer end gate (130) during thermal expansion and contraction. The remaining brackets (150), (152), (156), (158) provide slots (162) with an open tolerance fit which allow the tabs to move laterally within the slots (162) upon the outer end gate (130) moving relative to the inner end gate (18) during thermal expansion and contraction. The tabs (136), (138), (140), (142), (144) and brackets (150), (152), (154), (156), (158) are again hidden from the outside of the vehicle while also being simple to assemble and disassemble.

The opposite ends (146), (148) of the outer end gate (130) have material removed to form notches (168) which mate with tabs (170) formed in the opposite ends (172), (174) of the inner end gate (18). The tabs (170) are free to slide in and out relative to the notches (168) upon movement of the outer end gate (130) relative to the inner end gate (18) caused by thermal expansion and contraction. The notches (168) and tabs (170) are hidden from the outside of the vehicle when the inner end gate (18) and outer end gate (130) are closed but may be viewed when the end gates (18), (130) are open.

The outer end gate (130) has a bottom side (176) that comprises a flange (178) extending outward from the outer end gate (130) toward the inner end gate (18). The inner end gate (18) has a bottom floor (180), and the flange (178) of the outer end gate (130) overlaps the bottom floor (180) of the inner end gate (18). The flange (178) of the outer end gate (130) has a slot (182), (184) through each end (186), (188) of the flange (178), and a hole (190) centered between the ends (186), (188) of the flange (178). The bottom floor (180) of the inner end gate (18) has three holes (192), (194), (196) corresponding in alignment to the two slots (182), (184) and one hole (190) in the flange (178) of the outer end gate (130). Three push-in expanding plastic retainers (198) are inserted in the corresponding slots (182), (184) and holes (190), (192), (194), (196) of the inner end gate (18) and outer end gate (130). The centered holes (190), (194) prevent lateral movement of the center of the outer end gate (130) while splitting the size effect of thermal expansion and contraction between opposite ends (146), (148) of the outer end gate (130) as previously described Again, the center holes (190), (194) and retainers (198) maintain a centered alignment between the outer end gate (130) and inner end gate (18) during thermal expansion and contraction. The retainers, (198) moderate grip allows the outer end gate (130) to move across the retainers (198) within the slots (182), (184) of the outer end gate (130) upon the outer end gate (130) thermally expanding or contracting and moving relative to the inner end gate (18). Only the heads (200) of the retainers (198) can be seen when viewed from the underside of the vehicle To aid against easy removability and theft, a lock button (202) feature is provided, as seen in FIG. 3. The top inner corners of the outer end gate (130) are removed to form a recess (204) (only one is shown), and holes (206) (only one is shown) are provided in the inner end gate (18) to correspond with the recesses (204). A lock button (202) (only one is shown) has a molded square head (210) and a barrel (212) that extends from the head (210). The barrel (212) has a conventional push-in lock feature which is inserted into the holes (206) provided in the inner end gate (18). The head (210) of the lock button (202) lies flush with the outer end gate (130) thus filling in the corners (204) of the outer end gate (130) which were removed. The lock button (202) prohibits one from lifting the outer end gate (130) vertically and removing it from the vehicle.

The foregoing description is of a preferred embodiment of the invention, and it will be understood by those of ordinary skill in the art that various modifications and changes may be made without departing from the scope of the invention as defined in the claims.

The embodiments of the invention in which an exclusive property or privilege is claimed are defined as follows:

1. An apparatus for connecting a composite body panel of a vehicle to a composite underbody of a vehicle wherein said apparatus allows for relative movement between said composite body panel and said composite underbody caused by said composite body panel and said composite underbody having different coefficients of linear thermal expansion comprising:

said composite body panel having opposite ends, a center located halfway between said opposite ends of said composite body panel, a top side and a bottom side;

said composite underbody having opposite ends, a center located halfway between said opposite ends of said composite underbody, a top side and a bottom side;

a plurality of first tabs extending downward from and integral with said top side of said composite body panel and one of said plurality of tabs being a center tab located on said center of said top side of said composite body panel;

a plurality of first means on said composite underbody for receiving said plurality of first tabs, said center tab being received in one of said first receiving means and being prohibited from moving laterally by said one of said first receiving means and said remaining plurality of first tabs being received by others of said first receiving means which allow said remaining plurality of first tabs to laterally move relative thereto upon said relative movement between said composite body panel and said composite underbody;

a plurality of second tabs extending from and integral with said opposite ends of said composite body panel and having the ability to flexibly bend upon relative movement of said composite body panel relative to said composite underbody;

a second means on said opposite ends of said composite underbody for receiving said second tabs and allowing for relative movement between said composite body panel and said composite underbody by allowing said plurality of second tabs to flex and move with the relative movement between said composite body panel and said composite underbody;

said bottom side of said composite body panel having a plurality of slots and having a first hole through said center of said bottom side of said composite body panel;

said bottom side of said composite underbody having a plurality of second holes in common alignment with said plurality of slots and said first hole in said bottom side of said composite body panel; and a plurality of retainers inserted through and connecting said plurality of second holes in said bottom side of said composite underbody with said commonly aligned slots and first hole in said bottom side of said composite body panel and gripping moderately so as to allow for movement of said composite body panel across said plurality of retainers within said plurality of slots caused by relative movement of said composite body panel relative to said composite underbody.

2. An apparatus for connecting a composite body panel of a vehicle to a composite underbody of a vehicle wherein said apparatus allows for relative movement between said composite body panel and said composite underbody caused by said composite body panel and said composite underbody having different coefficients of linear thermal expansion as stated in claim 1 wherein:

said composite body panel comprises a reinforced reaction injection moldable material; and said composite underbody comprises a structural reaction injection moldable material having a lower coefficient of linear thermal expansion than said composite body panel.

3. An apparatus for connecting a composite body panel of a vehicle to a composite underbody of a vehicle wherein said apparatus allows for relative movement between said composite body panel and said composite underbody caused by said composite body panel and said composite underbody having different coefficients of linear thermal expansion as stated in claim 1 wherein:
  said composite body panel comprises an outer body panel of a pickup truck:
  said composite underbody comprises a one-piece composite pickup truck cargo box;
  said plurality of second tabs of said composite body panel each having a third hole through said plurality of second tabs;
  said composite underbody having a plurality of fourth holes in common alignment with said third holes of said plurality of second tabs; and
  said second means of receiving said plurality of second tabs comprising a plurality of second retainers inserted through said commonly aligned third holes in said plurality of second tabs and said plurality of fourth holes in said composite underbody.

4. An apparatus for connecting a composite body panel of a vehicle to a composite underbody of a vehicle wherein said apparatus allows for relative movement between said composite body panel and said composite underbody caused by said composite body panel and said composite underbody having different coefficients of linear thermal expansion as stated in claim 1 wherein;
  said composite body panel comprises an outer end gate of a pickup truck; and
  said composite underbody comprises an inner end gate of a composite pickup truck cargo box having a lower coefficient of linear thermal expansion than said outer endgate.

5. An apparatus for connecting a composite body panel of a vehicle to a composite underbody of a vehicle wherein said apparatus allows for relative movement between said composite body panel and said composite underbody caused by said composite body panel and said composite underbody having different coefficients of linear thermal expansion as stated in claim 1 comprising:
  said plurality of first tabs each having a free end; and
  a pair of tangs integral with and extending upward from said free end of said plurality of first tabs and said tangs having the ability to flexibly bend inward toward said first tab upon the application of an inward force and flexibly bend back to an extended position upon the release of said inward force.

6. An apparatus for connecting a composite outer body panel of a pickup truck to a composite pickup truck cargo box wherein said apparatus allows for the relative movement between said composite outer body panel and said composite cargo box caused by said composite outer body panel and said composite cargo box having different coefficients of linear thermal expansion comprising:
  said composite outer body panel having a top side, a bottom side, a front end, a rear end and a center located halfway between said front end and said rear end of said composite outer body panel;
  said composite cargo box having a top side, a bottom side, a front end, a rear end and a center located halfway between said front end and said rear end of said composite cargo box;
  a plurality of first tabs integral with and extending downward from said top side of said composite outer body panel and said plurality of first tabs having a free end and a pair of tangs integral with and extending upward from said free end of said plurality of first tabs, and said tangs having the ability to flexibly bend inward toward said tab upon the application of an inward force while also flexibly bending back to the extended position upon the release of said inward force;
  a center tab integral with and extending downward from said top side of said composite outer body panel and located at said center of said composite outer body panel;
  a lip integral with said top side of said composite cargo box and extending outward toward said composite outer body panel and having a plurality of slots in said lip and in common alignment with said plurality of first tabs and said center tab, and said slots receiving said plurality of first tabs and said center tab wherein one of said slots is located in said center of said composite cargo box and has a tolerance fit with said center tab designed to prevent lateral movement of said center tab from said center, and said remaining slots and first tabs having a tolerance fit designed to allow for relative movement within said slots between said outer body panel and said composite cargo box;
  said tangs of said plurality of first tabs extending under said molded lip and preventing the disengaging of said first tabs of said outer body panel from said composite cargo box;
  a plurality of second tabs integral with and extending outward from said front end of said composite outer body panel towards said composite cargo box and having first holes through each of said plurality of second tabs whereby said second tabs have the ability to flex upon relative movement between said composite outer body panel and said composite cargo box; having a plurality of second holes in common alignment with said first holes in said plurality of second tabs;
  a plurality of first retainers inserted through said commonly aligned first holes of said plurality of second tabs and said second holes in said front end of said composite cargo box;
  said bottom side and rear end of said composite outer body panel having a plurality of slots through said composite outer body panel and having a third hole through said center of said bottom side of said composite outer body panel;
  said bottom side and rear end of said composite cargo box having fourth holes in common alignment with said plurality of slots and said third hole of said composite outer body panel; and
  a plurality of second retainers inserted through said commonly aligned-slots and third and fourth holes and gripping moderately so as to allow for movement of said composite outer body panel across said second retainers within said slots upon relative movement of said composite outer body panel to said composite cargo box while prohibiting lateral movement of said composite outer body panel at said center.

7. An apparatus for connecting a composite outer body panel of a pickup truck to a composite pickup truck cargo box wherein said apparatus allows for the relative movement between said composite outer body panel and said composite cargo box caused by said composite outer body panel and said composite cargo box having different coefficients of linear thermal expansion as stated in claim 6 wherein:
said composite outer body panel comprises a reinforced reaction injection moldable material; and
said composite cargo box comprises a structural reaction injection moldable material having a lower coefficient of linear thermal expansion than said composite outer body panel.

8. An apparatus for connecting a composite outer end gate of a pickup truck to a composite inner end gate of a pickup truck cargo box wherein said apparatus allows for the relative movement between said outer end gate and said inner end gate caused by said inner end gate and said outer end gate having different coefficients of linear thermal expansion comprising; side, opposite ends, a bottom side, a back side and a center located halfway between said opposite ends of said composite outer end gate;
said composite inner end gate having a top side, opposite ends, a bottom side, a front side and a center located halfway between said opposite ends of said composite inner end gate;
a plurality of first tabs integral with and extending downward from said backside of said top side of said composite outer end gate and having one of said plurality of first tabs located in said center of said outer end gate;
a plurality of brackets mounted onto said front side of said top side of said composite inner end gate and having openings to receive said plurality of first tabs wherein one of said plurality of brackets is mounted in said center of said composite inner end gate and having an opening providing a tolerance fit with said first tab in said center of said outer end gate designed to prevent relative lateral movement from said center while the remaining of said openings provide a tolerance fit with said remaining first tabs designed to allow relative movement of said remaining first tabs within said openings;
a plurality of notches integral with and recessed inward from said backside of said opposite ends of said outer end gate;
a plurality of second tabs in said opposite ends of said inner end gate received by said plurality of notches allowing for relative movement of said outer end gate to said inner end gate;
said bottom side of said outer end gate having a plurality of slots and a first hole located in said center of said outer end gate;
said bottom side of said inner end gate having a plurality of second holes in common alignment with said slots and said first hole of said outer end gate;
a plurality of retainers inserted into said commonly aligned slots and first and second holes and gripping moderately so as to prohibit relative lateral movement from said center and allowing for relative lateral movement of said outer end gate across said retainers within said slots;
a pair of lock button assemblies on said opposite ends of said composite outer end gate and each of said pair of lock button assemblies having a locking member, a third hole in said inner end gate to receive said locking member and a corner removed from said top side of said outer body panel; and
said locking member having a square head and a barrel integral with and extending from said square head and inserted into said third hole of said inner end gate and said square head seated in and flush with said removed corner of said top side of said outer end gate so as to prohibit vertical movement and the removal of said outer end gate.

9. An apparatus for connecting a composite outer end gate of a pickup truck to a composite inner end gate of a pickup truck cargo box wherein said apparatus allows for the relative movement between said outer end gate and said inner end gate caused by said outer end gate and said inner end gate having different coefficients of linear thermal expansion as stated in claim 8 wherein;
said composite outer end gate comprises a reinforced reaction injection moldable material and
said composite inner end gate comprises a structural reaction injection moldable material having a lower coefficient of linear thermal expansion than said composite outer end gate.

* * * * *